United States Patent [19]
Romberg

[11] 3,817,133
[45] June 18, 1974

[54] GLASS SHEAR

[75] Inventor: Hendrik Romberg, Emmasingel, Eindhoven, Netherlands

[73] Assignee: U.S. Phillips Corporation, New York, N.Y.

[22] Filed: Jan. 30, 1973

[21] Appl. No.: 328,083

[30] Foreign Application Priority Data
Feb. 5, 1972 Netherlands .................... 7201535

[52] U.S. Cl. .................... 83/171, 83/600, 83/694, 83/701
[51] Int. Cl. ............................................ C03b 5/38
[58] Field of Search ....... 83/171, 170, 16, 600, 623, 83/694, 701; 62/DIG. 10; 65/133, 334; 30/350, 123 R

[56] References Cited
UNITED STATES PATENTS

| | | | |
|---|---|---|---|
| 2,053,039 | 9/1936 | McSwain | 83/623 X |
| 3,193,926 | 7/1965 | Honiss | 65/334 X |
| 3,203,290 | 8/1965 | Ashby | 83/171 X |
| 3,264,077 | 8/1966 | Bishop | 65/133 |
| 3,296,821 | 1/1967 | Malinin | 83/915.5 X |

*Primary Examiner*—J. M. Meister
*Attorney, Agent, or Firm*—Frank R. Trifari

[57] ABSTRACT

A glass shear having two co-operating shear blades of which the blade body is provided on both sides and substantially throughout the entire surface with a layer of material having a high coefficient of thermal conductivity, preferably silver; a cooling pipe is soldered on the silver layer on one side of the blade body.

2 Claims, 5 Drawing Figures

GLASS SHEAR

The invention relates to a glass shear having two co-operating shear blades, in which the body of the blades comprises at least one cooling duct which can be connected to an inlet and an outlet for a cooling medium.

In a known glass shear for cutting a flow of glass emanating from the feeder outlet of a glass furnace into glass portions, the shear blades are externally cooled by a cooling medium which is sprayed by means of atomizers against the shear blades which are relatively thin. In this case, however, the cooling must be periodically interrupted since the cooling medium may be sprayed only in the retracted position of the shear blades in which the flow of glass is not subjected to an undesired cooling by the cooling medium.

In order to obtain a continuous cooling of the shear blades and to prevent the annoying dripping of the cooling medium, the shear blades of another known glass shear are cooled internally. For that purpose, the body of the shear blades is provided with cooling chambers or cooling ducts through which a cooling medium flows via an inlet and an outlet. For providing the cooling ducts it is necessary to give the body of the blade a considerably thicker and heavier construction than in the case of external cooling. Because, however, the knife edge and the adjacent part of the body of the blade, which during cutting penetrates into the flow of glass must be as thin as possible, no cooling ducts can be provided in the immediate proximity of the knife edge. In view of the high processing temperatures of the molten glass, in the order of magnitude of 1,100° C, the body of the blade must be manufactured from a material having a high resistance to detrition, a great hardness and must withstand high temperatures, for example, high-speed steel. However, such materials have a poor coefficient of thermal conductivity. The heat dissipation from the thin knife edges must take place over a large distance and through material which is a poor heat conductor.

Experiments have demonstrated that said known glass shears, both with external and with internal cooling of the shear blades, no longer meet the requirements which are imposed in the case of very high cutting frequencies of over 5,000 cycles per hour; as a result of insufficient cooling of the knife edges, the temperature thereof rises too high so that the glass adheres to the knife edges as a result of which an irregular dropping of the portions and disturbances in the production process occur.

It is an object of the present invention to provide a glass shear which does not exhibit the above-described drawbacks and the shear blades of which are constructed so that, in spite of a simple construction, a sufficient cooling of the knife edges is ensured in all operating conditions and at very high cutting frequencies.

According to the invention this object is mainly achieved in that a layer of material having a high coefficient of thermal conductivity is provided on each blade body on both sides and substantially throughout the entire surface hereof, the cooling duct being formed by a cooling pipe on at least one of the sides of the body of the blade.

By providing a layer of a readily heat conducting material, the poor coefficient of thermal conductivity of the material, from which the body of the blade which has to be resistant to detrition has been manufactured, is compensated for, while cooling ducts or cooling chambers in the body of the blade are no longer necessary as a result of the provision of a cooling pipe on the body of the blade. By using the possibility of a thin and light-weight body of the blade which is normally used in the case of external cooling, a simple and cheap construction is obtained. As a result of the high coefficient of thermal conductivity of the provided material layer, such an effective cooling of the knife edges is obtained that the temperature hereof does no longer increase too high and high cutting frequencies are possible.

As a material having a high coefficient of thermal conductivity may be used, for example, copper. However, in a preferred embodiment of the glass shear according to the invention the provided material layer consists of silver, while the cooling pipe is made from copper and is soldered to the silver layer. With such a practical construction of the glass shear according to the invention which has been tested in practice and in which the body of the blade manufactured from high speed steel had a thickness of 1.5 mm, and had been provided with a 0.5 mm thick silver layer, and in which the cooling pipe having an inside diameter of 4 mm was from copper, glass portions were cut at a frequency of 8000 portions per hour without any disturbance in the production process occurring.

The invention will be described in greater detail with reference to an embodiment shown in the drawing. In the drawing.

Figure 1:
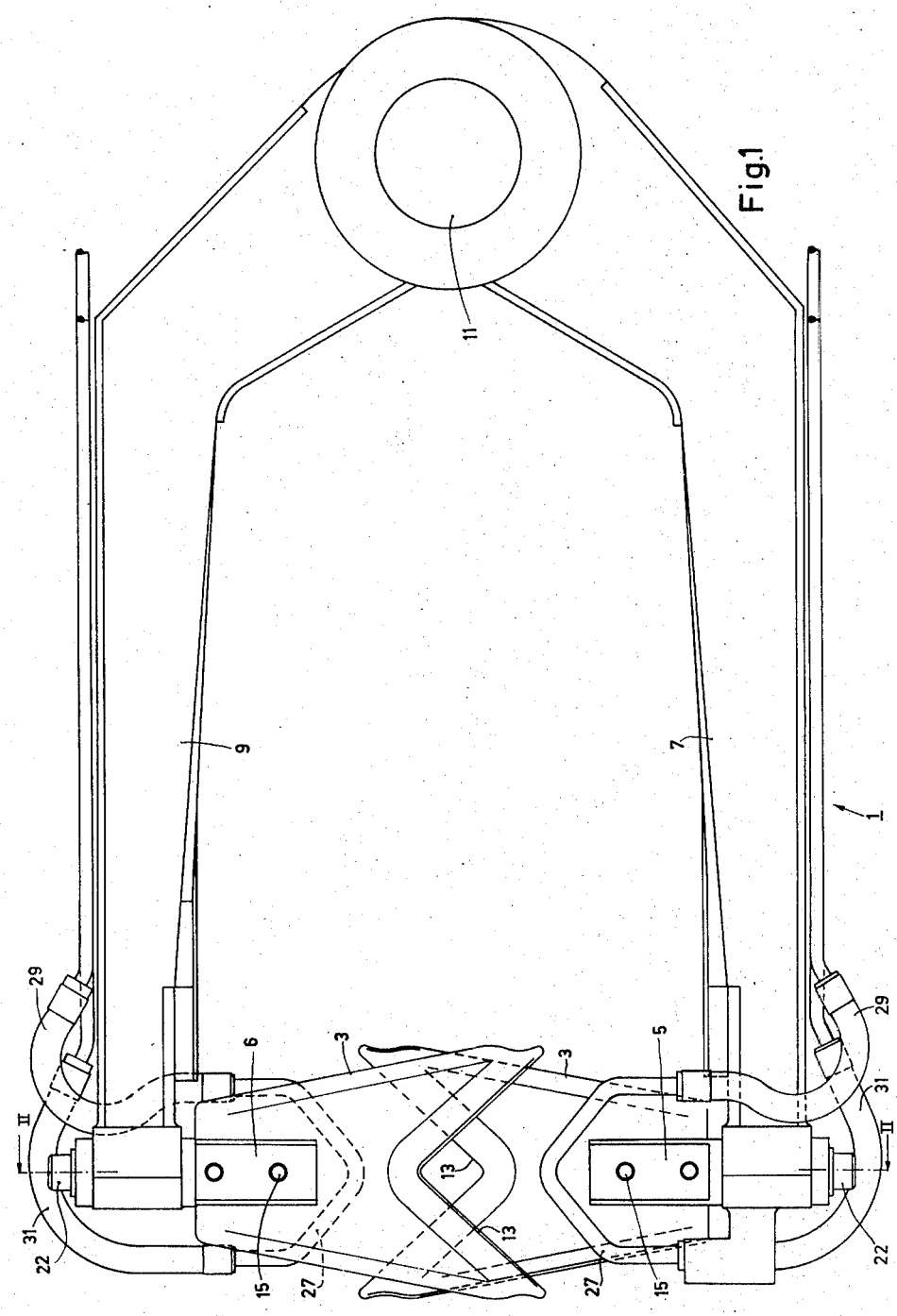
FIG. 1 is a plan view of a glass shear according to the invention
Figure 2:
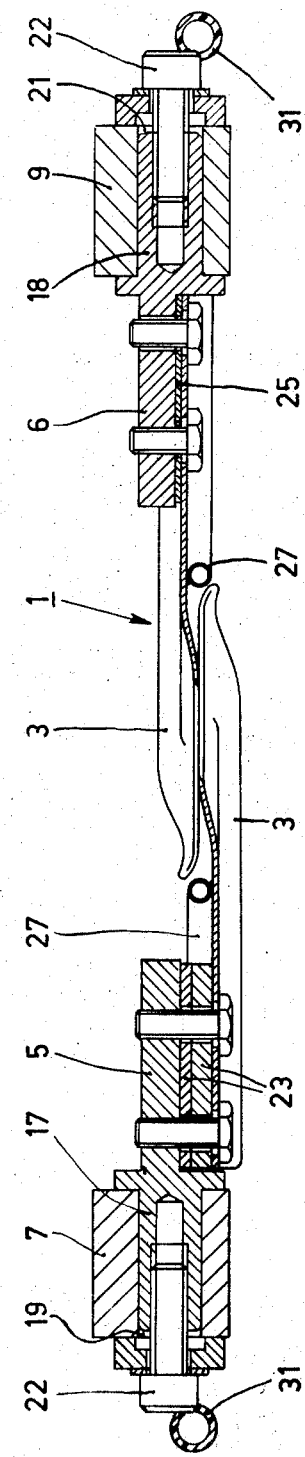
FIG. 2 is a sectional view of the glass shear taken on the line II—II of FIG. 1

FIGS. 1 and 2 show a glass shear 1 having two identical co-operating shear blades 3 which are each secured to arms 7 and 9 by means of connection elements 5, 6. The two arms are rotatably journalled on a shaft 11 and are driven in known manner; by a mechanism which is not shown, so as to periodically move the shear blades 3 towards each other and away from each other. The glass shear 1 is arranged relative to a glass furnace in such manner that the shear blades 3 become located below the outflow aperture of the glass furnace. By the cutting movements of the shear blades 3, in which these blades overlap each other partly, a flow of glass emanating from the outflow aperture is cut into equal portions by the knife edges 13 of the shear blades and then fed to a glass forming machine. The shear blades 3 are connected, by means of screw connections 15, to the connection elements 5, 6 which are adjustably journalled with a cylindrical end 17, 18 in apertures 19 and 21, respectively, of the arms 7 and 9. By rotating the connection elements 5, 6 relative to the arms 7 and 9, the shear blades 3 can be adjusted in an accurate position parallel with respect to each other and be secured in this position by means of clamping screws 22. By means of inserts 23 and 25 the distance in assembly between the shear blades 3 can be adjusted. A cooling pipe 27 is provided on one side of each shear blade 3; by means of hoses 29 and 31, said cooling pipes can be connected to an inlet and outlet for cooling water.

Figure 3:
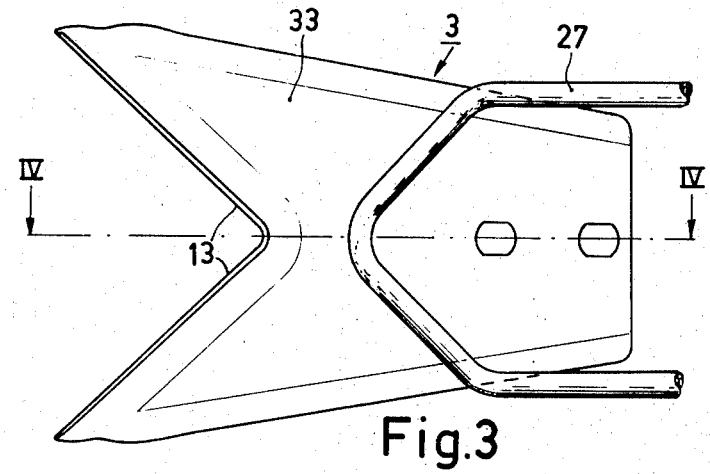
FIG. 3 is a plan view of a shear blade
Figure 4:
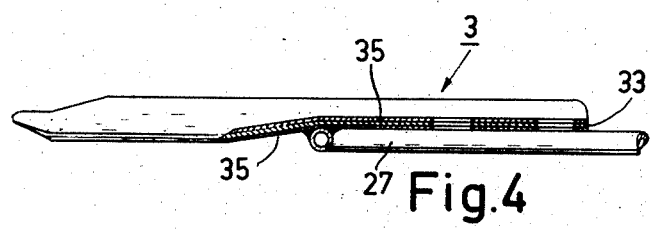
FIG. 4 is a longitudinal sectional view of the shear blade taken on the line IV—IV of FIG. 3
Figure 5:
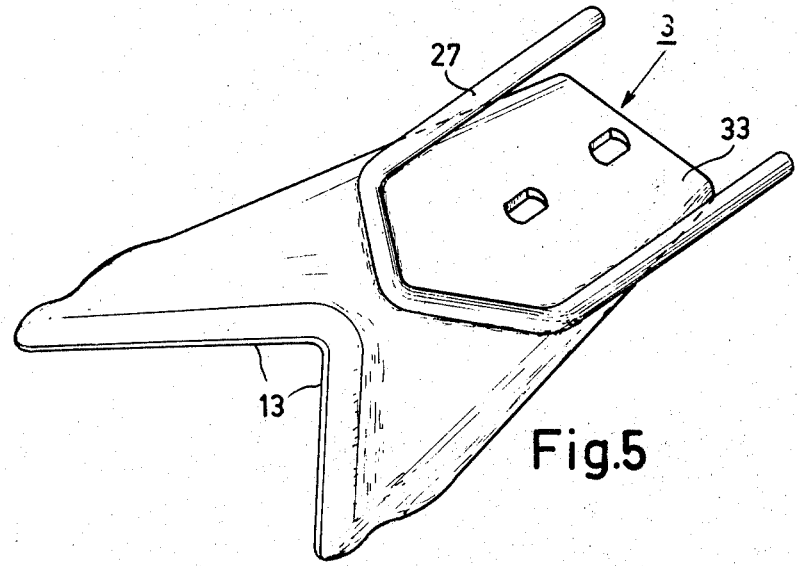
FIG. 5 is a perspective view of the shear blade.

FIGS. 3, 4 and 5 show in greater detail one of the two identical shear blades 3 of which the blade body 33 is constructed from a material having a high resistance to detrition, a great hardness and can withstand high temperatures but has a poor coefficient of thermal conductivity, for example high-speed steel. A layer 35 of a material having a high coefficient of thermal conductivity, for example silver, is electrolytically provided on the blade body 33 on both sides and over the whole surface with the exception of the knife edge 13. The knife edge 13 is then finish-ground. On one side of the blade body 33 the pre-formed, U-shaped cooling pipe 27 of red copper is soldered to the silver layer 35. During cutting of a glass portion the two shear blades 3 overlap each other partly. The cooling pipe extends as far as possible up to the knife edge 13 without, however, contacting the other shear blade or the flow of glass during cutting.

It is obvious that the heat dissipation can be further improved, if necessary, by providing a second cooling pipe on the same side or on the other side of the blade body or by such a design of the cooling pipe that said pipe contacts the blade body over a greater length.

What is claimed is:

1. A glass shear having two co-operating shear blades mounted for movement with respect to each other for cooperative engagement, each blade comprising a body of relatively high hardness and low thermal conductivity, and a layer of material having a relatively high coefficient of thermal conductivity electrolytically secured on each blade body on both sides and substantially over the entire surface thereof, at least one cooling pipe connected to said layer on at least one of the sides of each blade, and inlet and outlet means for supplying cooling medium to said pipe.

2. The glass shear as claimed in claim 1, wherein said layer of material is silver, and said cooling pipe is copper, said pipe being soldered to the silver layer.

* * * * *